UNITED STATES PATENT OFFICE.

JULIUS EHLIS, OF LIEGE, BELGIUM, ASSIGNOR OF ONE-FOURTH TO A. SCHOVERLING, OF NEW YORK, N. Y.

LAMP-WICK.

SPECIFICATION forming part of Letters Patent No. 412,736, dated October 15, 1889.

Application filed June 9, 1888. Serial No. 276,642. (No specimens.) Patented in England March 15, 1888, No 4,040.

*To all whom it may concern:*

Be it known that I, JULIUS EHLIS, of Liege, in the Kingdom of Belgium, have invented a certain new and useful Improvement in Lamp-Wicks for Burning Petroleum and Similar Oils, of which the following is a specification, the same having been patented in England March 15, 1888, No. 4,040.

My invention relates to incombustible wicks for petroleum-lamps; and it consists, essentially, of a wick formed of certain new and useful combinations of elements, in the manner substantially as hereinafter described and claimed.

The essential novel feature of my improved lamp-wick is its formation of clay, to which is to be added such an amount of silica (sand) and alkaline salt—such as borax—as will cause the mass to vitrify or harden at a low temperature. Soda may be employed instead of borax, as they are equivalents of each other.

To give the requisite porosity to the wick, cellulose is added to the mass in the form of sawdust or other convenient small particles, which will be distributed through it by mixing. Instead of cellulose, resin or carbonate of lime may be used for this purpose. The cellulose is intended to be decomposed by the heat used to vitrify the mass, and to produce the requisite porosity by the liberation of its gases during the process of vitrifaction. The substances above mentioned are made into a plastic paste with water, are then molded or shaped into a tubular or other suitable form of wick for a lamp, and are dried and burned or vitrified by the application of heat. The ingredients may, however, be mixed and vitrified in a mass and then sawed or cut into suitable form for a lamp-wick. To prevent excessive vitrifaction or hardening, gypsum and white lead may be added, if desired, to the paste while it is being mixed.

The proportions of the above ingredients must be varied somewhat, according to the nature and quality of the clay employed, and they will vary within considerable limits. Using the ordinary fire-proof clay, however, the following formula will produce good results: one part, by weight, of clay; one part, by weight, of silica; one-eighth part, by weight, of borax; one part, by weight, of cellulose. Mix with water to a thick paste and dry and burn until vitrified.

I do not confine my wick to the tubular form described, as it may be made flat instead of cylindrical, although I prefer the latter form.

What I claim as new and of my invention is—

1. The described lamp-wick, formed of clay, silica, borax, and cellulose moistened and mixed into a paste and vitrified by the action of heat, substantially as described.

2. A lamp-wick consisting of the following elements: clay, silica, borax, cellulose, gypsum, and white lead vitrified by heat, substantially as described.

3. The described lamp-wick, formed of clay, silica, borax, and cellulose moistened and mixed into a paste and molded into the tubular form of the lamp-wick while in a plastic state and vitrified by the action of heat, substantially as described.

JULIUS EHLIS.

Witnesses:
WM. S. PRESTON,
J. GROSS.